Nov. 18, 1941.                E. H. SCHULTZ                2,262,969
                               WHEEL PULLER
                            Filed Jan. 9, 1939        2 Sheets-Sheet 1
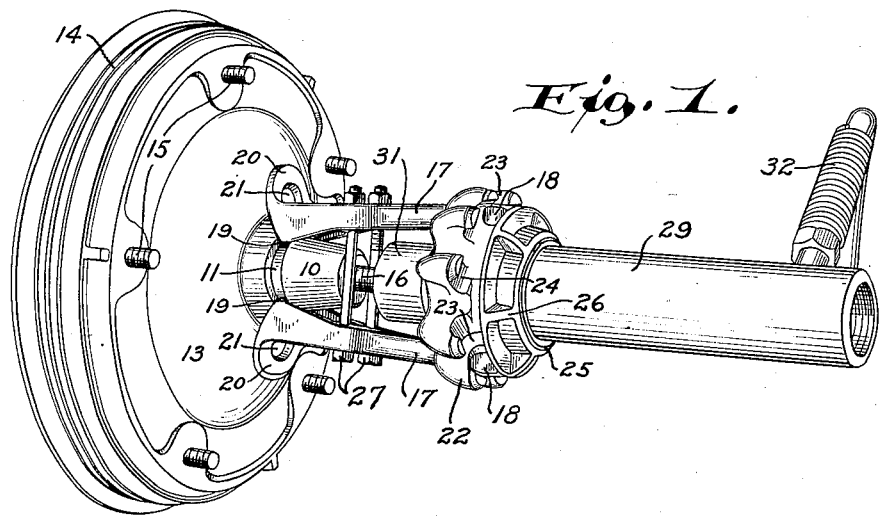
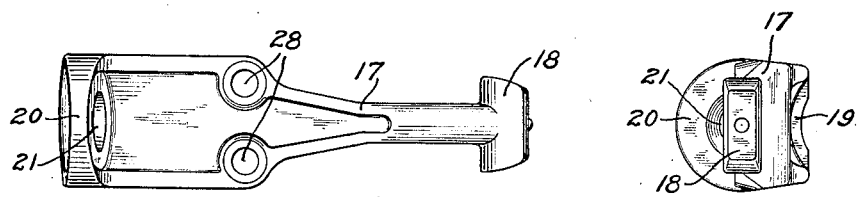
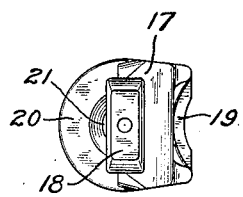
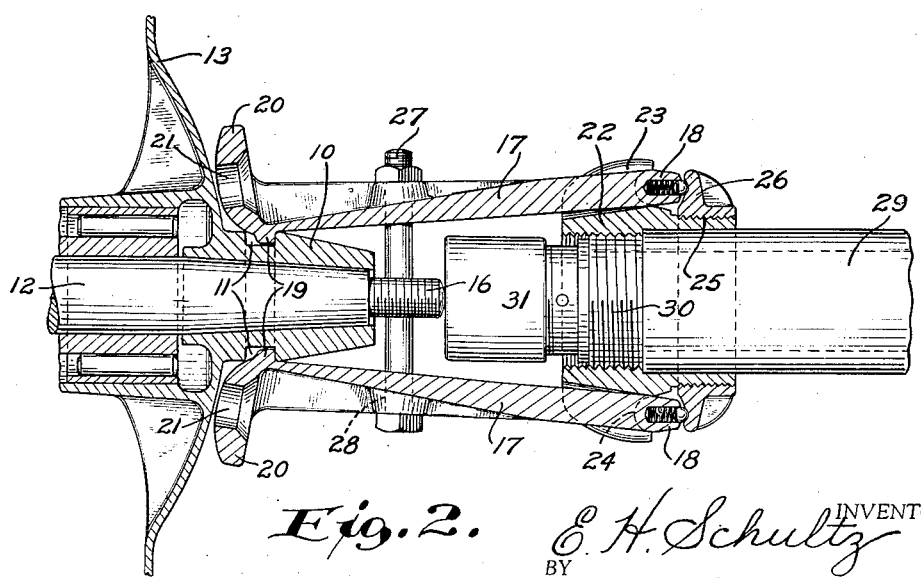

Nov. 18, 1941.  E. H. SCHULTZ  2,262,969
WHEEL PULLER
Filed Jan. 9, 1939  2 Sheets-Sheet 2
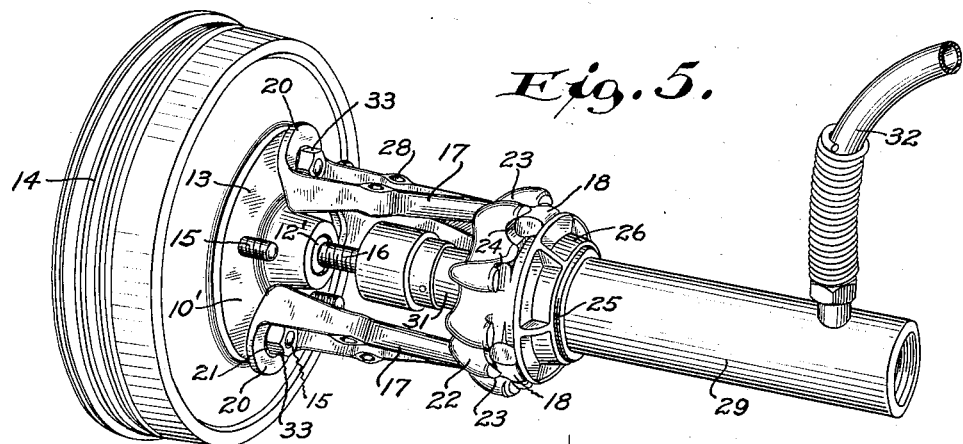
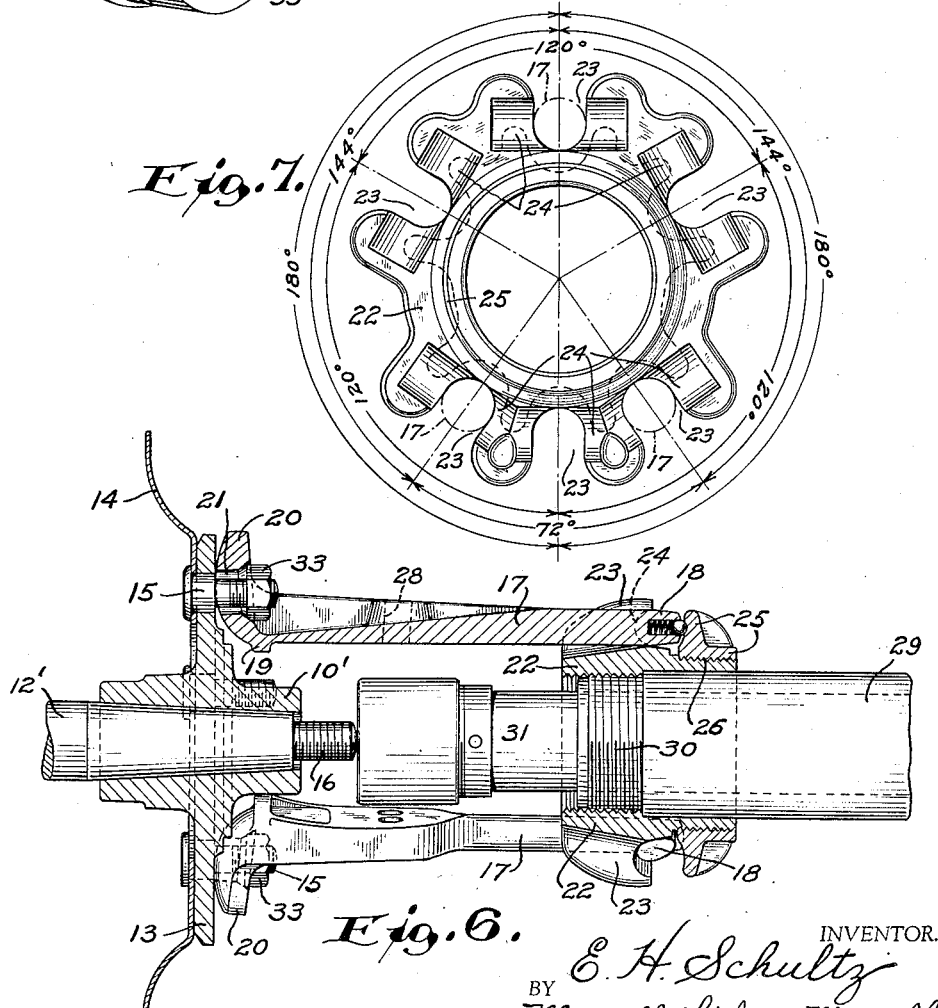
INVENTOR.
E. H. Schultz
BY Morsell, Lieber & Morsell
ATTORNEYS.

Patented Nov. 18, 1941

2,262,969

UNITED STATES PATENT OFFICE 2,262,969

WHEEL PULLER

Edward H. Schultz, Milwaukee, Wis., assignor to Blackhawk Mfg. Co., Milwaukee, Wis., a corporation of Wisconsin Application January 9, 1939, Serial No. 249,878

3 Claims. (Cl. 29—85)

My present invention relates in general to improvements in apparatus for dismantling certain parts of vehicles, and relates more specifically to improvements in the construction and operation of wheel pullers for effecting removal of automobile wheel hubs from their supporting spindles or drive shafts.

Generally defined, an object of my present invention is to provide an improved wheel puller which is simple and compact in construction, and which is also highly flexible and efficient in use.

Different types of automobiles are frequently provided with different kinds of wheel mountings, and while all of the standard present day wheels have outwardly projecting central hub portions coacting with tapered driving or supporting spindles, the bolts for attaching the rims and brake drums to the wheels are not spaced equi-distant from the wheel axes in all cases and the number of attaching bolts used is not the same. For example, in one type of popular car, the bolts are disposed remote from the wheel axis, and the manufacturer has provided an annular groove in the wheel hub, which may be utilized to good advantage in facilitating removal of the wheel from the propelling and supporting axle. In another popular type of an automobile, five bolts located quite close to the wheel axis are employed, while still another of the more popular motor vehicles utilizes six equally spaced bolts disposed relatively near to the axis of the drive shaft. In all cases, the wheels are secured firmly to the tapered shaft ends and should be withdrawn from the tapers parallel to the shaft axes; and it is desirable for mechanics in the ordinary garage to have a single tool or apparatus for effecting removal of any of the several types of wheels. No such unitary tool has heretofore been provided, and it has been necessary for mechanics to have special equipment available for facilitating removal of each of the several classes of wheels.

It is therefore an object of my present invention to provide new and extremely useful equipment comprising a single unit for pulling any of various standard types of automobile wheels from their driving or supporting axles, in a most effective and expeditious manner.

Another object of the invention is to provide improved simple and readily manipulable apparatus which is interchangeably cooperable either with a groove in the hub or with variable numbers of wheel rim and brake drum attaching bolts, to pull automobile wheels from the ends of their axle shafts parallel to the shaft axes.

Still another object of my invention is to provide a wheel puller which is extremely flexible in use, which may be utilized to quickly and effectively remove either truck or pleasure car wheels, which may be operated with an ordinary jack, and which may be manufactured and sold at moderate cost.

These and other specific objects will be apparent from the following detailed description.

A clear conception of several embodiments of my invention, and of the mode of constructing and of utilizing the improved wheel puller to effect removal of several types of wheels, may be had by referring to the drawings accompanying and forming a part of this specification in which like reference characters designate the same or similar parts in the various views.

Fig. 1 is a perspective view of one of the improved wheel puller assemblages applied to a wheel of the type having a groove in the hub;

Fig. 2 is an enlarged longitudinal central section through the assemblage of Fig. 1;

Fig. 3 is a similarly enlarged plan view of one of the improved wheel puller legs;

Fig. 4 is an end view of the wheel puller leg of Fig. 3;

Fig. 5 is a perspective view of the wheel puller assemblage applied to a wheel of the type having no groove in the hub but having five brake drum attaching bolts located relatively near to the wheel axis;

Fig. 6 is an enlarged central longitudinal section through the assemblage of Fig. 5; and Fig. 7 is a plan view of the improved puller head.

While the invention has been shown in action and as being applied to only two specific types of wheels, and as being especially adapted for use with a hydraulic jack or ram, it is not intended to thereby unnecessarily limit the range of use of the improvement.

Referring to the drawings, the type of vehicle wheel specifically illustrated in Figs. 1 and 2, is utilized in the more recent Ford vehicles, and comprises an outwardly directed central hub 10 having therein an annular external recess 11 and an internal tapered bore with which the tapered axle or drive shaft 12 coacts; an annular convex flange 13 formed integral with the hub 10; and a brake drum 14 normally secured to the hub flange 13 by means of an annular series of five bolts 15 which also serve to clamp the wheel rim to the flange 13. The hub 10 normally coacts with a roller bearing in a well known manner, and the axle shaft 12 has a threaded extension 16 which projects outwardly beyond the wheel hub 10 when the shaft 12 is in place.

My improved wheel hub puller consists primarily of a plurality of similar tension members or legs 17 each having one end provided with an integral cross-piece 18 and its opposite end provided with an inner lug 19 and with an outer flange 20, the latter having a central bolt receiving opening 21 therein; a suspension head 22 having a series of peripheral slots 23 formed for reception of the ends of the legs 17 and also having semicircular notches 24 for receiving the cross-piece 18 of the legs; a retaining ring or collar 25 having internal screw threads cooperable with screw threads 26 formed on the outer end portion of the head 22 and being provided with a smooth annular groove 38 facing all of the cross-pieces 18; and two cross bolts 27 adapted to cooperate with holes 28 formed in the medial portions of the legs 17 when the latter coact with diametrically opposite notches 24 of the head 22. The cross-piece 18 of each leg 17 is also provided with a spring pressed element or ball 39, all of which coact with the retainer ring groove 38. The legs 17 are all of like and interchangeable construction, and the head 22 is provided with six slots 23 and corresponding notches 24, so spaced, that either two diametrically opposite slots 23 and legs 17 may be used as in Fig. 1; or three slots 23 and legs 17, two of which are separated by seventy-two degrees and the other of which is spaced from the first mentioned two by one-hundred forty-four degrees, may be utilized as in Fig. 5; or three slots 23 and legs 17 separated by one hundred and twenty degrees may be utilized, see Fig. 7. This specific construction of the head 22 will obviously permit most effective use thereof in connection with various types of wheel hubs having either a hub recess 11 as in Figs. 1 and 2, or bolt circles of different diameters and bolt series having either five or six equally spaced bolts.

The improved hub puller assemblage above described is especially adapted to be operated by means of a hydraulic jack or ram. This ram may consist of a liquid confining cylinder 29 having one end closed and its opposite end provided with screw threads 30 coacting with internal threading of the head 22; a plunger 31 reciprocable within the cylinder 29 and having its outer end formed for engagement with the extreme end of the axle extension 16; and a flexible conduit 32 to admit fluid under pressure to the cylinder 29. This ram assemblage is extremely simple and efficient and may be readily attached to or removed from the improved hub puller, but any other type of power jack may obviously be substituted for the hydraulic ram.

When utilizing the improved hub puller to remove a wheel such as shown in Figs. 1 and 2, and having a hub recess 11, from an axle shaft 12, two of the improved legs 17 are sufficient. The cross-pieces 18 of these legs 17 should be caused to coact with the diametrically opposite slots 23 and notches 24 of the head 22 as shown in Fig. 2, and after the inner lugs 19 have been positioned within the annular recess 11 on opposite sides of the wheel hub 10, the bolts 27 may be applied to the openings 28 to hold the legs 17 in pulling position. The nut which normally coacts with the threaded extension 16 should of course be removed before the puller assemblage is applied, and the retaining collar 25 should also be applied to the screw threads 26 as illustrated in Fig. 2, in order to retain the cross-pieces 18 within the saddle notches 24. The spring pressed balls 39 coacting with the smooth collar recess 38, will permit free rotation of the collar 25 for adjustment, and also permit individual swinging of the legs 17 about their cross-pieces 18 for individual setting of the legs. The ram cylinder 29 may be applied to the puller assemblage, and upon application of hydraulic pressure, the plunger 31 will obviously be brought in contact with the axle extension 16, and the subsequent relative movement of the cylinder 29 and plunger 31 will cause the wheel hub 10 to be gradually withdrawn from the axle shaft 12 in alinement with its axis. During such removal of the wheel, the legs 17 will be under tension, and by virtue of the fact that these legs coact with diametrically opposite portions of the recess 11, the pull will always be exerted in true alinement with the axle shaft 12.

When utilizing the improved puller assemblage to remove a modified wheel such as shown in Figs. 5 and 6 having no recessed hub 10' but having a relatively small bolt circle with five equally spaced bolts 15 in the annular series, the bolts 27 are not utilized. In the modified wheel assemblage, the hub 10' has a long central tapered bore with which the axle shaft 12' coacts, and the flange 13 to which the brake drum 14 is attached, is substantially plane. The hub puller may be applied to such a modified wheel in the manner illustrated, that is, by utilizing three legs 17 the outer ends of which coact with sets of slots 23 and saddle notches 24 of the leg flanges 20 may be caused to cooperate with two adjacent bolts 15 spaced seventy-two degrees apart, while the third leg flange may be caused to simultaneously coact with the bolt 15 which is spaced from the two first mentioned bolts by one-hundred forty-four degrees, as will be clearly apparent from Fig. 7. After the threaded ends of these bolts have been inserted in the flange openings 21, nuts 33 may be applied, either as shown or inverted, and the remainder of the assemblage would be the same as previously described. With this assemblage, application of hydraulic pressure within the cylinder 29 will first cause the plunger 31 of the ram, to engage the threaded shaft extension 16, and will thereafter cause the legs 17 to exert a pull upon the bolts 15 and thus pull the hub 10' axially from the tapered end portion of the axle shaft 12', because of the symmetrical disposition of the three legs 17 about the axis of the shaft 12', the pull will again be exerted parallel to the shaft and effective withdrawal of the hub 10' may be quickly but gradually effected, without danger of damaging the parts.

The puller assemblage may obviously be used in cases where the bolt circle of the bolts 15 is larger or smaller than shown, and may also be employed where the bolt series comprises six instead of five bolts 15. In the latter case, three tension members or legs 17 spaced apart one hundred and twenty degrees and coacting with alternate bolts 15 of the series, would be utilized in order to insure uniform distribution of the pull about the shaft and hub axis. In case of seven bolts 15, additional slots 23 may be provided in order to insure uniform distribution of forces, but so far as known, none of the standard wheels utilize such a specific number of bolts. The retaining collar 25 preferably coacts with the cross-pieces 18 of the legs 17 through spring pressed friction balls 39 coacting with a smooth annular recess 38 in the collar 25, as shown, in order to avoid possible binding.

From the foregoing detailed description, it will be apparent that my present invention provides an extremely simple, compact and readily manipulable wheel puller assemblage which is exceedingly efficient and flexible in use. The same assemblage may be utilized to quickly and most effectively pull various types of wheel hubs from their supporting shafts, and the improved puller may obviously be conveniently applied to either type of wheel hub and to hubs having different diameters of bolt circles and different numbers of bolts. The improvement has proven highly successful in actual use, and the assemblage may obviously be manufactured at moderate cost.

It should be understood that it is not desired to limit this invention to the exact details of construction or to the precise mode of use, herein shown and described, for various modifications within the scope of the claims may occur to persons skilled in the art.

I claim:

1. A wheel puller comprising, an annular head formed for attachment to one of the relatively movable elements of a jack the other element of which is cooperable with the end of a wheel supporting shaft, said head having an annular series of radially disposed peripheral slots and also having transverse notches at the ends of said slots remote from the active end of said other jack element, a plurality of tension members each having one end provided with an integral cross-piece cooperable with a set of said head notches and its opposite end formed for pulling coaction with a wheel hub associated with the wheel supporting shaft while the medial portion of the member is disposed in one of said slots, an adjustable ring having screw thread engagement with said head and being provided with a smooth annular groove facing said tension member cross-pieces, and a spring pressed ball carried by each of said cross-pieces and coacting with said groove to permit free rotation of said ring and frictionally restrained radial swinging of said tension members.

2. A wheel puller comprising, an annular head formed for screw thread attachment to the cylinder of a hydraulic ram having a plunger movable away from the head and cooperable with the end of a wheel supporting shaft, said head having an annular series of radially disposed peripheral slots and also having transverse semi-circular notches at the ends of said slots remote from the active end of said ram plunger, a plurality of similar tension members each having one end provided with an integral semi-circular sectioned cross-piece cooperable with a set of said head notches and its opposite end formed for pulling coaction with a wheel hub associated with the wheel supporting shaft while the medial portion of the member is disposed in one of said slots, an adjusting ring having screw thread engagement with said head and being provided with a smooth annular groove facing all of said tension member cross-pieces, and a spring pressed friction ball carried by each of said cross-pieces and coacting with said groove to permit free rotation of said ring during adjustment and frictionally restrained radial swinging of said tension members.

3. A wheel puller comprising, a head formed for attachment to a jack and having an annular series of slots and notches at the end of each slot, a plurality of tension members each having an end provided with cross-pieces swingable in a set of said notches and its opposite end formed for pulling coaction with the wheel hub while the medial portion of the member is disposed in one of said slots, an adjusting ring having screw thread engagement with said head and being provided with a smooth annular groove facing all of said tension member cross-pieces, and a spring pressed friction element carried by each of said cross-pieces and coacting with said groove to permit free rotation of said ring during adjustment and frictionally restrained swinging of said tension members.

EDWARD H. SCHULTZ.